US011785352B2

(12) United States Patent
    Sakamoto

(10) Patent No.: US 11,785,352 B2
(45) Date of Patent: Oct. 10, 2023

(54) IMAGE ENCODING APPARATUS, METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Daisuke Sakamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/589,972

(22) Filed: Feb. 1, 2022

(65) Prior Publication Data

US 2022/0256127 A1    Aug. 11, 2022

(30) Foreign Application Priority Data

Feb. 10, 2021   (JP) .................... 2021-020069

(51) Int. Cl.
    *H04N 19/00*      (2014.01)
    *H04N 25/13*      (2023.01)
    *G06T 9/00*       (2006.01)
    *H04N 19/117*     (2014.01)
    *H04N 19/124*     (2014.01)
    *H04N 19/186*     (2014.01)
    *H04N 23/84*      (2023.01)

(52) U.S. Cl.
    CPC .......... *H04N 25/134* (2023.01); *G06T 9/00* (2013.01); *H04N 19/117* (2014.11); *H04N 19/124* (2014.11); *H04N 19/186* (2014.11); *H04N 23/843* (2023.01)

(58) Field of Classification Search
    CPC .. H04N 25/134; H04N 19/117; H04N 19/124; H04N 19/186; H04N 23/843; G06T 9/00
    See application file for complete search history.

(56) References Cited

U.S. PATENT DOCUMENTS

| 7,480,417 | B2 | 1/2009 | Malvar |
| 8,363,717 | B2 | 1/2013 | Togita et al. |
| 10,003,821 | B2 | 6/2018 | Sakamoto |
| 10,097,840 | B2 | 10/2018 | Sakamoto |
| 10,277,902 | B2 | 4/2019 | Sakamoto |

(Continued)

FOREIGN PATENT DOCUMENTS

| JP | 2003-125209 A | 4/2003 |
| JP | 2006-121669 A | 5/2006 |

*Primary Examiner* — Zhihan Zhou
(74) *Attorney, Agent, or Firm* — Venable LLP

(57) ABSTRACT

This invention provides an image encoding apparatus operable to encode RAW image data obtained from a capturing sensor that has a color filter array in which a plurality of filters for each of three primary colors and a plurality of filters for a specific color for luminance are arranged in an N×N pixel region, where the image encoding apparatus comprises a conversion unit which converts the RAW image data into a plurality of planes each configured by a single color component; and an encoding unit which encodes each of the planes, wherein the conversion unit, for each component representing the three primary colors, by referencing pixel values of the same component in the N×N pixel region, generates a plane configured by a low-frequency component data and a plane configured by a high-frequency component.

17 Claims, 7 Drawing Sheets

(56) References Cited

U.S. PATENT DOCUMENTS

| | | |
|---|---|---|
| 2005/0276328 A1 | 12/2005 | Sakamoto |
| 2006/0083432 A1* | 4/2006 | Malvar ................ H04N 25/134 |
| | | 348/E9.01 |
| 2013/0177074 A1 | 7/2013 | Togita et al. |
| 2015/0103212 A1* | 4/2015 | Saito ...................... H04N 9/646 |
| | | 348/242 |
| 2015/0201209 A1 | 7/2015 | Sakamoto |
| 2017/0034460 A9* | 2/2017 | Mitsunaga ........... H04N 25/585 |
| 2017/0118476 A1* | 4/2017 | Sakamoto ............. G06T 3/4015 |
| 2017/0118491 A1* | 4/2017 | Togita .................. H04N 19/186 |
| 2017/0163954 A1* | 6/2017 | Sato ....................... G06V 10/60 |
| 2018/0247964 A1* | 8/2018 | Sugizaki ........... H01L 27/14645 |
| 2019/0068929 A1* | 2/2019 | Sato ....................... H04N 23/74 |
| 2021/0281778 A1* | 9/2021 | Sugizaki ............... H04N 25/133 |
| 2022/0036590 A1* | 2/2022 | Zuo .......................... G06T 7/90 |

\* cited by examiner

FIG. 4

| G0 | W0 | R0 | W1 | G0 | W0 | R0 | W1 |
|----|----|----|----|----|----|----|----|
| W2 | G1 | W3 | R1 | W2 | G1 | W3 | R1 |
| B0 | W4 | G2 | W5 | B0 | W4 | G2 | W5 |
| W6 | B1 | W7 | G3 | W6 | B1 | W7 | G3 |
| G0 | W0 | R0 | W1 | G0 | W0 | R0 | W1 |
| W2 | G1 | W3 | R1 | W2 | G1 | W3 | R1 |
| B0 | W4 | G2 | W5 | B0 | W4 | G2 | W5 |
| W6 | B1 | W7 | G3 | W6 | B1 | W7 | G3 |

| G0 | W0 | R0 | W0 | G0 | W0 | R0 | W0 |
|----|----|----|----|----|----|----|----|
| W1 | G1 | W1 | R1 | W1 | G1 | W1 | R1 |
| B0 | W0 | G2 | W0 | B0 | W0 | G2 | W0 |
| W1 | B1 | W1 | G3 | W1 | B1 | W1 | G3 |
| G0 | W0 | R0 | W0 | G0 | W0 | R0 | W0 |
| W1 | G1 | W1 | R1 | W1 | G1 | W1 | R1 |
| B0 | W0 | G2 | W0 | B0 | W0 | G2 | W0 |
| W1 | B1 | W1 | G3 | W1 | B1 | W1 | G3 |

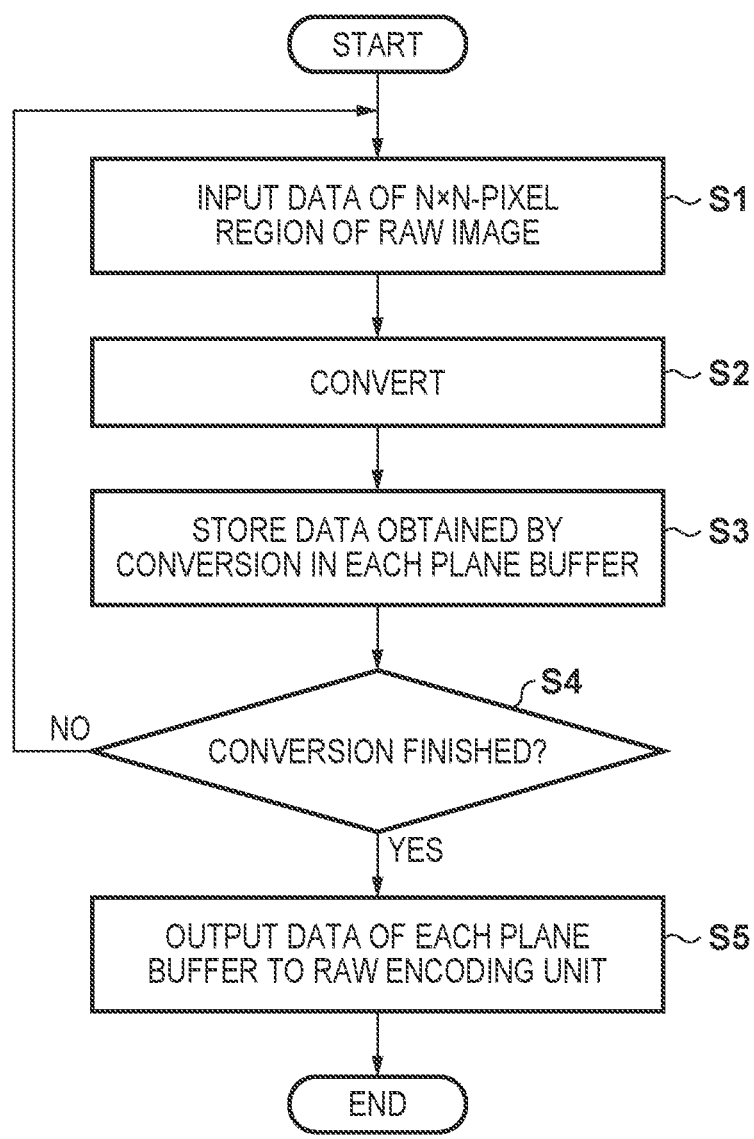

IMAGE ENCODING APPARATUS, METHOD FOR CONTROLLING THE SAME, AND NON-TRANSITORY COMPUTER-READABLE STORAGE MEDIUM

BACKGROUND OF THE INVENTION

Field of the Invention

The present invention relates to a technique for encoding RAW image data.

Description of the Related Art

Recently, image capturing apparatuses such as a digital camera or a digital camcorder employ a CCD sensor or a CMOS sensor as a capturing sensor. These sensors arrange color filter arrays (hereinafter referred to as CFAs) on their surfaces, and one color filter corresponds to one pixel and corresponds to one color component. As a typical example of a CFA, for example, there is a periodic pattern arrangement of R (red), G0 (green), B (blue), and G1 (green) as illustrated in FIG. 3. This pattern array is generally called a Bayer array. Image data (hereinafter, RAW image data) is obtained through the CFA.

It is known that human visual characteristics have high sensitivity to luminance components. For this reason, in a general Bayer arrangement, as illustrated in FIG. 3, the number of pixels of the green (G) component whose luminance component is larger is made to be twice the number of pixels of the red component and the number of pixels of the blue component. In RAW image data, one pixel has only information of one color component. Therefore, it is necessary to generate red (R), blue (B), and green (G) information for one pixel by using a process called demosaicing. Image data of the RGB signal obtained by the demosaicing or the YUV signal obtained by further converting the RGB signal is generally recorded on a recording medium after being encoded. However, since an image having three color components in one pixel will be generated by the demosaicing, the amount of data is 3 times the RAW image data. Therefore, several methods of directly encoding and recording RAW data before demosaicing have been proposed.

For example, Japanese Patent Laid-Open No. 2003-125209 (hereinafter referred to as Document 1) discloses a method of coding each plane after separating RAW data into R, G0, B, and G1 planes (i.e., four planes).

In addition, Japanese Patent Laid-Open No. 2006-121669 (hereinafter referred to as Document 2) discloses a method in which RAW data is divided into four planes of R, G0, B, and G1 in the same manner as in Patent Document 1, and then converted to approximate luminance (Y) and color difference (Co, Cg, and Dg) and encoded.

On the other hand, a sensor with a color filter array different from that in FIG. 3 has been developed to increase sensitivity at low illuminance. FIG. 4 is an arrangement called a dual Bayer+HDR (High Dynamic Range) array structure, which is a CFA for generating image data of white (W) pixels in addition to red (R), green (G), and blue (B) pixels. A pixel array of 4×4 is repeated, and the ratio of the number of pixels of each color is R:G:B:W=2:4:2:8. The W pixels do not have an interposed color filter, and so the whole range of visible light is allowed pass through. Therefore, the W pixels have a higher sensitivity than each of the RGB pixels. Consequently, the CFA of FIG. 4 can improve sensitivity with respect to luminance compared to a CFA composed of only R, G, and B. The plane conversion methods described in Documents 1 and 2 are premised upon the Bayer arrangement illustrated in FIG. 3, and do not correspond to a CFA having W pixels in addition to RGB.

SUMMARY OF THE INVENTION

The present invention provides a technique for efficiently coding RAW data obtained by a color filter array (CFA) capturing sensor for generating a bright pixels such as white pixels in addition to the R, G, and B pixels.

According to an aspect of the invention, there is provided an image encoding apparatus operable to encode RAW image data obtained from a capturing sensor that has a color filter array in which a plurality of filters for each of three primary colors and a plurality of filters for a specific color for luminance are arranged in an N×N pixel region and in which the filters of the N×N pixel region are repeated, the image encoding apparatus comprising: a conversion unit configured to convert the RAW image data into a plurality of planes that are each configured by a single color component; and an encoding unit configured to encode each plane obtained by the conversion unit, wherein the conversion unit, for each component representing the three primary colors, by referencing pixel values of the same component in the N×N pixel region, generates a plane configured by a low-frequency component data and a plane configured by a high-frequency component.

By virtue of the present invention, it becomes possible to efficiently encode RAW image data from a capturing sensor having a color filter array that generates bright pixels such as white pixels in addition to the three primary color components.

Further features of the present invention will become apparent from the following description of exemplary embodiments with reference to the attached drawings.

BRIEF DESCRIPTION OF THE DRAWINGS

FIG. 4 is a diagram illustrating an example of a dual Bayer+HDR arrangement according to the first embodiment.

FIGS. 5A, 5B, and 5C are diagrams for explaining a G component plane conversion method.

FIG. 7 is a diagram illustrating an example of a dual Bayer+HDR arrangement according to a second embodiment.

FIG. 8 is a flowchart illustrating a processing procedure of the plane conversion unit in the first embodiment.

DESCRIPTION OF THE EMBODIMENTS

Figure 1:
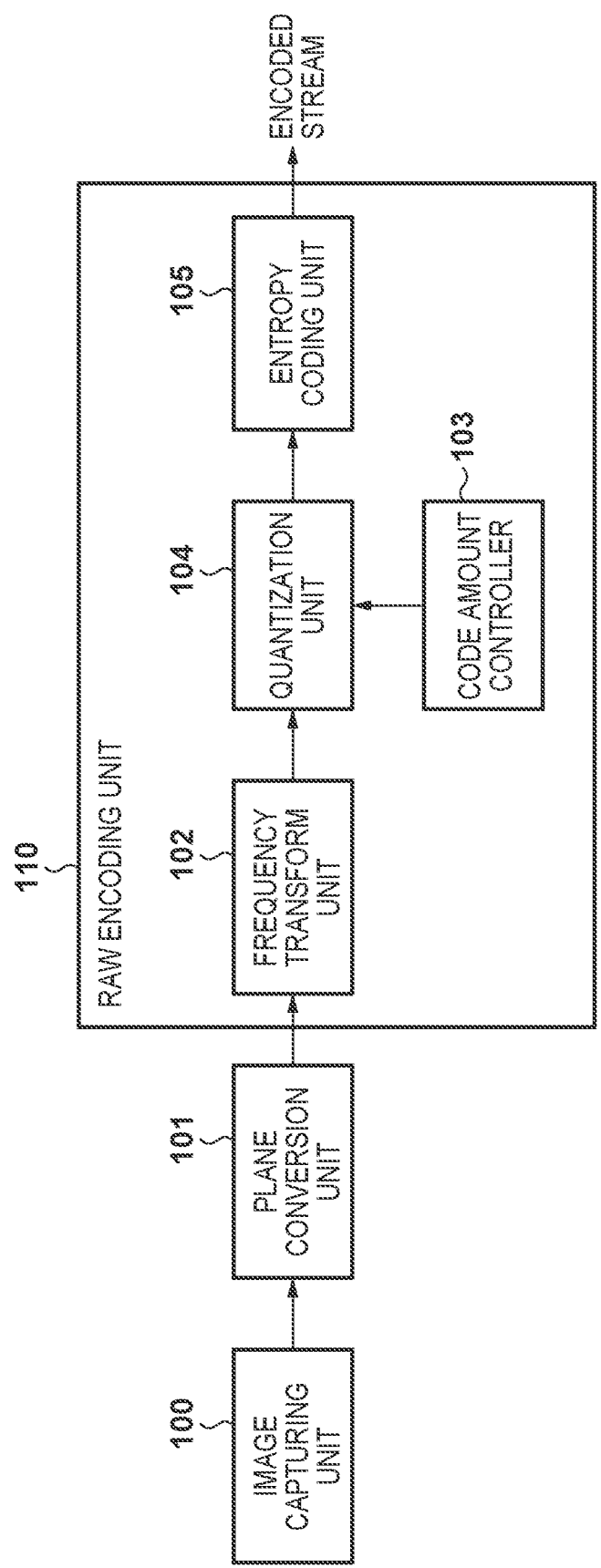
FIG. 1 is a block configuration diagram of an encoding apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Hereinafter, with reference to drawings, the embodiment of the present invention is described in detail.

FIG. 1 illustrates a block configuration diagram when the image encoding apparatus according to the embodiment is applied to an image capturing apparatus.

As illustrated in FIG. 1, the image encoding apparatus includes an image capturing unit 100, a plane conversion unit 101, and a RAW encoding unit 110. The RAW encoding unit 110 includes a frequency transform unit 102, a code amount controller 103, a quantization unit 104, and an entropy coding unit 105. Although details will be described later, the RAW encoding unit 110 encodes the coding target plane inputted from the plane conversion unit 101 so that the target amount is set based on the color and type (low-frequency plane, high-frequency plane, or the like). The image capturing apparatus has a configuration such as an operation unit for a user to perform an operation, a recording unit for recording a captured image, and the like, but these are not illustrated because they are not the main focus of the present invention. In the present embodiment, JPEG2000 is used as an example of the encoding scheme, but the type of the encoding method is not particularly limited.

First, a method of coding an input image will be described with reference to FIG. 1.

An image capturing unit 100 has a general image capturing optical unit composed of an optical lens, an aperture mechanism, a shutter mechanism, an imager (capturing sensor), and the like. The imager is of a type that separates colors to capture an image, and is of a CCD type or MOS type having a color filter array (CFA) for color separation on the surface, for example. The imager separates colors of an imaged optical image and converts it into an electrical signal corresponding to the amount of light.

A color separation filter included in the imager of the image capturing unit 100 in the present embodiment will be described on the assumption that a dual Bayer+HDR array filter illustrated in FIG. 4 is used. As illustrated in FIG. 4, W color (white) filters are arranged in a checkered pattern in the 4×4 pixel region, and the number of those filters is eight which is half of the region. Further, four G-color filters are arranged consecutively in a diagonal direction. Also, two R-colored filters and two B-colored filters are arranged so as to be adjacent in a diagonal direction. Therefore, each pixel of the RAW image data output by the image capturing unit 100 will have a value of the corresponding color (component) indicated by the dual Bayer+HDR array arrangement illustrated in FIG. 4.

The plane conversion unit 101 inputs RAW image data of a 4×4 pixel array as illustrated in FIG. 4, and performs processing (plane conversion) for generating a plurality of plane data of a single color component.

First, the plane conversion of the G component will be described. In the plane conversion of the G component, the plane conversion unit 101 first performs the following primary conversions using G0 and G1, and G2 and G3.

$GL01=G0+G1$ $GH01=G0-G1$ $GL23=G2+G3$ $GH23=G2-G3$

Subsequently, the plane conversion unit 101 executes the following secondary conversions using the low-frequency values GL01 and GL23 obtained by the above-described primary conversion.

$GL=GL01+GL23$ $GH=GL01-GL23$

Then, the plane conversion unit 101 transmits to the frequency transform unit 102 a total of four single component planes: component values GL, GH, GH01, and GH23 obtained by the conversions. Here, the component value GL represents the low-frequency value of the G component in the 4×4 pixel region in the RAW image (low-frequency plane), the other component values GH, GH01, and GH23 can be said to represent high-frequency values of the G component in the 4×4 pixel region (high-frequency plane). Incidentally, in descending order, the frequency components have the relationship: GH01=GH23>GH01>GL.

Next, the plane conversion of the R component will be described. In the plane conversion of the R component, the plane conversion unit 101 performs the following conversions using R0 and R1.

$RL=R0+R1$ $RH=R0-R1$

Then, the plane conversion unit 101 transmits to the frequency transform unit 102 a total of two single component planes: the component values RL and RH obtained by the conversions. Here component value RL represents a low-frequency value of the R component of the 4×4 pixel region and the component value RH represents a high-frequency value of the R component in the 4×4 pixel region.

Next, the plane conversion of the B component will be described. In the plane conversion of the B component, the plane conversion unit 101 performs the following conversions using B0 and B1.

$BL=B0+B1$ $BH=B0-B1$

Then, the plane conversion unit 101 transmits to the frequency transform unit 102 a total of two single component planes: the component values BL and BH obtained by the conversions. Here component value BL represents a low-frequency value of the B component of the 4×4 pixel region, the component value BH represents a high-frequency value of the B component in the 4×4 pixel region.

The plane conversion unit 101 without performing a plane conversion for the W component in the 4×4 pixel region, separates W0 to W7, and transmits each to the frequency transform unit 102. In other words, the plane conversion unit 101 generates and outputs a total of eight planes for the W component: a plane composed of only W0, a plane composed of only W1, . . . , and a plane composed of only W7, which are relatively in the same position within the 4×4 pixel region.

In summarizing the above, the plane conversion unit 101 in the embodiment plane-converts the 4×4 pixel region.

A total of 16 planes: GL, GH, GH01, and GH23 for the G component;
RL and RH for the R component;
BL and BH for the B component; and
W1 to W7 for the W component
are generated and transmitted to the frequency transform unit 102. When the number of horizontal pixels of the RAW image is W and the number of pixels in the vertical direction is H, for example, the size of the GL plane composed of only the GL component value among the above 16 component values is W/4×H/4. The planes of the component values other than the GL component are also the same size, W/4×H/4.

Figures 5A, 5B, 5C:
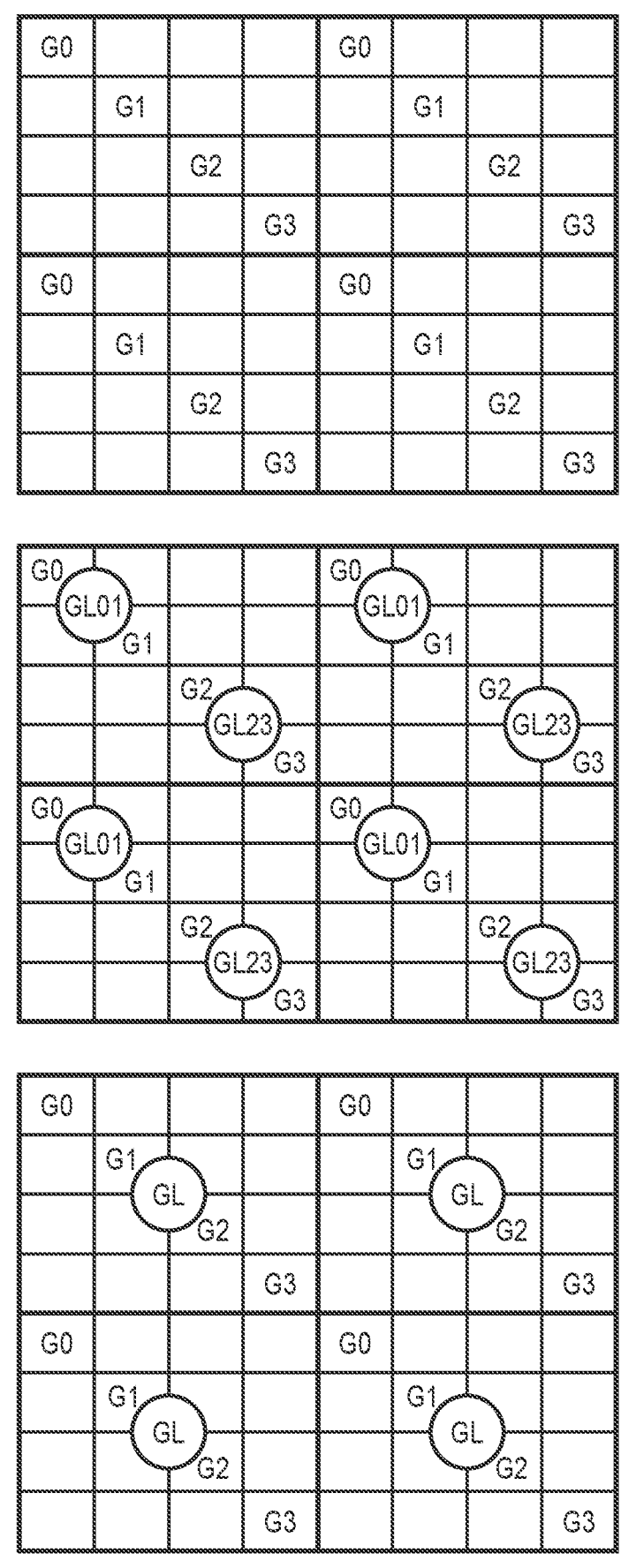

FIG. 5A is a view in which only the G components of the dual Bayer+HDR array arrangement of FIG. 4 was extracted.

The pixel arrangement of the G component is adjacent in the right diagonal direction, while there are G components with 3-pixel jumps therebetween in the vertical and horizontal directions. Since the interval between pixels is not fixed, the arrangement is unsuitable for separating high-frequency components and low-frequency components in the downstream frequency transform unit 102.

Here, the effect on coding efficiency of the plane conversion will be described by taking the plane conversion of the G component as an example.

GL01 generated in the first plane conversion of the G component is the sum of G0 and G1. Since it corresponds to taking the average of G0 and G1, it corresponds to constructing a low-frequency component of the frequency transform. That is, the generation of GL01 corresponds to the generation of an intermediate pixel value between G0 and G1 as illustrated in FIG. 5B. Similarly, the generation of GL23 corresponds to the generation of an intermediate pixel between G2 and G3 as illustrated in FIG. 5B. On the other hand, GH01 and GH23 correspond to high-frequency components of the frequency transform since they take a difference. Since GL is generated by the sum of GL01 and GL23, GL corresponds to low-frequency components of a secondary frequency transform, and GL corresponds to intermediate pixels of GL01 and GL23 as illustrated in FIG. 5C.

Also, in the pixel arrangement of the finally generated GL plane, GL components are arranged uniformly with 3-pixel jumps therebetween in both horizontal and vertical directions. Since the pixels are uniform in the horizontal and the vertical, the arrangement is suitable for separating the high-frequency components and low-frequency components in downstream frequency transform unit 102. Therefore, it is possible to appropriately reduce a high-frequency component while leaving a low-frequency component which has a large effect on image quality when performing quantization in the quantization unit 104.

On the other hand, the GH plane corresponds to a plane of a secondary high-frequency component.

In the plane conversion of the present embodiment, RL, BL, and W0 to W7 are arranged in horizontally and vertically uniform pixel arrays with similar three-pixel jumps so that efficient coding processing can be performed. RH and BH correspond to high-frequency components of a similar frequency transform as GH01 and GH23.

The frequency transform unit 102 performs a wavelet transform on each of the 16 plane data of GL, GH, GH01, GH23, RL, RH, BL, BH, and W0 to W7 inputted from the plane conversion unit 101. As a result, a plurality of subbands (one subband includes a plurality of transform coefficients) are generated from a single plane data. The frequency transform unit 102 outputs transform coefficients of the plurality of subbands obtained from each plane data to the quantization unit 104.

Here, the wavelet transform will be described using a configuration example of the wavelet transform unit in FIG. 6.

Figure 6:
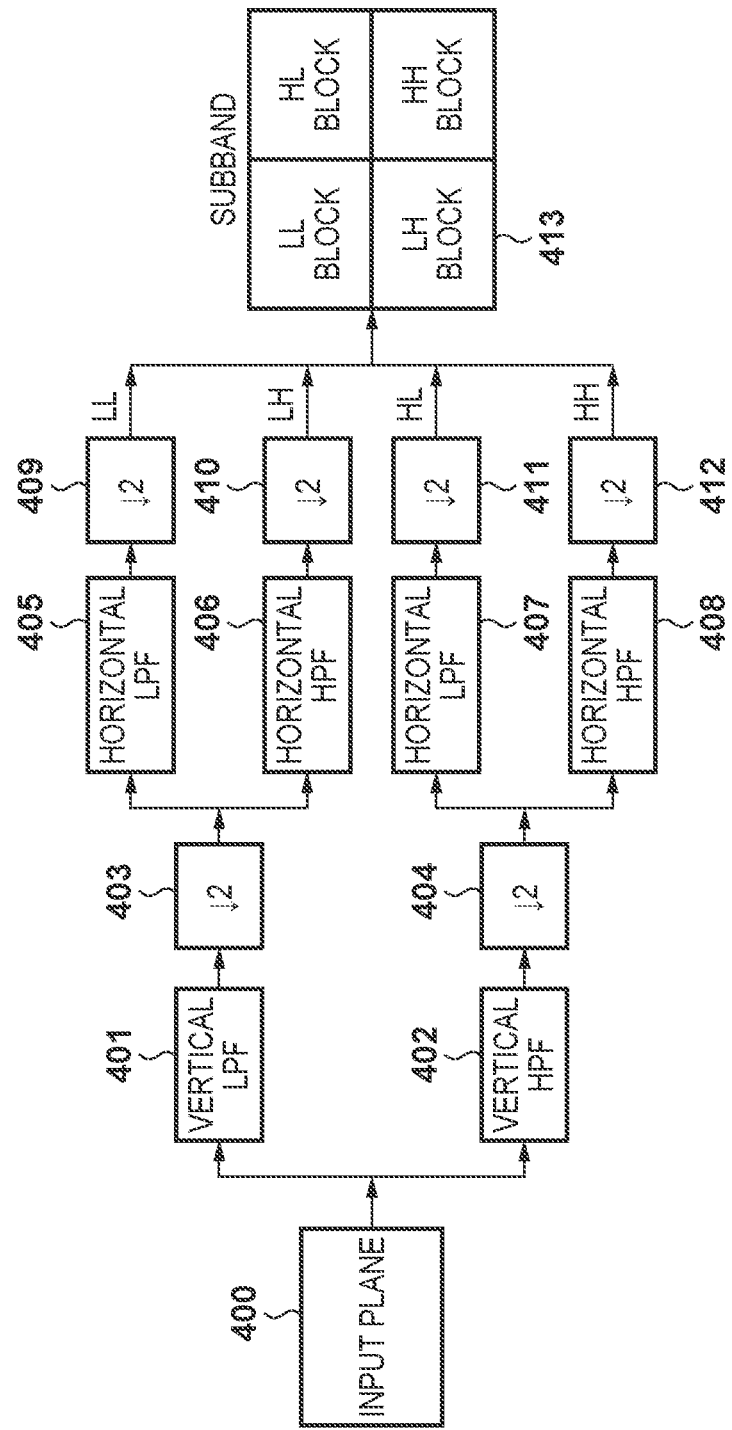
FIG. 6 is a diagram for explaining the wavelet transform.

FIG. 6 illustrates an exemplary wavelet transform unit that performs only one level of subband decomposition (one time), which is a method adopted in JPEG2000. In the figure, "LPF" means low-pass filter, and "HPF" means high-pass filter. In FIG. 6, a vertical low-pass filter 401 performs vertical low-frequency filtering on an input plane 400 to generate vertical low-frequency component data and outputs it to a downsampling circuit 403. Also, a vertical high-pass filter 402 performs vertical high-frequency filtering on the input plane 400 to generate vertical high-frequency component data and outputs it to the downsampling circuit 404. Each of downsampling circuits 403 and 404 downsamples the input data by 2:1. Specifically, the downsampling circuit 403 outputs low-frequency component data with half the vertical resolution compared to the original input plane 400, and the downsampling circuit 404 outputs high-frequency component data with half the vertical resolution compared to the original input plane 400.

A downsampling circuit 403 supplies the vertical low-frequency component data to the horizontal low-pass filter 405 and the horizontal high-pass filter 406. The horizontal low-pass filter 405 performs low-frequency filtering in the horizontal direction, and outputs to the downsampling circuit 409. The horizontal high-pass filter 406 performs high-frequency filtering in the horizontal direction, and outputs to the downsampling circuit 410. Each of downsampling circuits 409 and 410 downsamples the input data by 2:1.

Meanwhile, a downsampling circuit 404 supplies the vertical high-frequency component data to the horizontal low-pass filter 407 and the horizontal high-pass filter 408. The horizontal low-pass filter 407 performs low-frequency filtering in the horizontal direction, and outputs to the downsampling circuit 411. The horizontal high-pass filter 406 performs high-frequency filtering in the horizontal direction, and outputs to the downsampling circuit 412. Each of downsampling circuits 411 and 412 downsamples the input data by 2:1.

As a result of the above, the subband 413 can be obtained. A subband 413, through the above filtering, is composed of an LL block, an HL block, an LH block, and an HH block. For the sake of simplifying of notation, these blocks will be described below as subbands LL, HL, LH, and HH as necessary. Here, L represents low-frequency, H represents high frequency, and the first of the two characters corresponds to vertical filtering, and the second character corresponds to horizontal filtering. For example, "HH" indicates high-frequency subbands in both vertical and horizontal directions. When the input plane 400 is regarded as an image, the subband LL in the subband 413 is an image resulting from reducing the resolution vertically and horizontally respectively by half. The regions of the subbands HH, HL, LH are data of high-frequency components.

The frequency transform unit 102 according to the embodiment inputs 16 plane data of GL, GH, GH01, GH23, RL, RH, BL, BH, W0 to W7 as the input plane 400 of FIG. 6. Then, the frequency transform unit 102 performs a wavelet transform for each plane data, and generates a subband 413. In general, the wavelet transform allows the subband LL obtained in the immediately preceding transform to be a recursive transform object. Therefore, the frequency transform unit 102 in the present embodiment may perform a multi-level wavelet transform.

The code amount controller 103 determines a target code amount to be allocated to each picture and each plane according to a compression ratio set by the user, and transmits the target code amount to the quantization unit 106. At this time, a code amount is uniformly allocated to each of the color components of R, G, B, and W. However, when the code amount of each component data in the same color plane is allocated, the code amount is allocated using the following relationships.

G component: $GL > GH > GH01 = GH23$

R component: $RL > RH$

B component: $BL > BH$

W component: $W0 = W1 = W2 = W3 = W4 = W5 = W6 = W7$

As described above, the component GL corresponds to the low-frequency component of the secondary frequency component, the component GH corresponds to the high-frequency component of the secondary GH, and the components GH01 and GH23 correspond to the high-frequency component of a primary frequency transformation. Therefore, by allocating a large amount of code to a low-frequency component which has a large effect on image quality and reducing the amount of code allocated to a high-frequency component which has a smaller effect on the image quality, efficient coding that ensures image quality is performed. Similarly, since the components RL and BL correspond to low-frequency components and the components RH and BH correspond to high-frequency components, a larger amount of code is allocated to the components BL and RL which have a large effect on the image quality, and a smaller amount of code is allocated to the components RH and BH. Note that the code amount to be assigned depends on a quantization parameter to be set in the quantization unit 104 described below.

The quantization unit 104 quantizes a transform coefficient sent from the frequency transform unit 102 using the quantization parameter determined based on the target code amount set from the code amount controller 103, and sends the quantized transform coefficient to the entropy coding unit 105.

The entropy coding unit 105 performs entropy coding such as EBCOT (Embedded Block Coding with Optimized Truncation) for each subband with respect to wavelet coefficients and a quantization parameter used in the quantization by the quantization unit 104 and outputs the encoded data. The output destination is generally a recording medium, but it may be a network, and the type thereof is not particularly limited.

Figure 2:
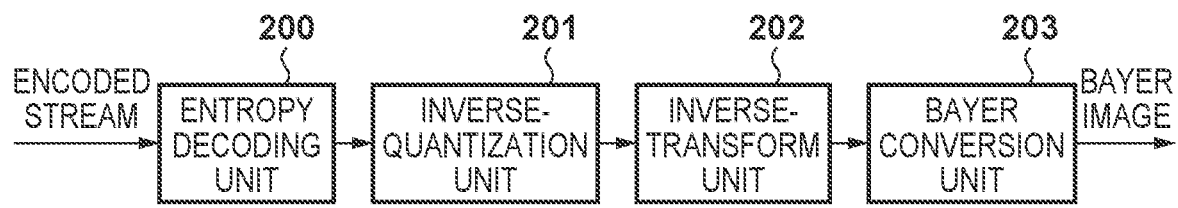
FIG. 2 is a block configuration diagram of a decoding apparatus according to a first embodiment.
Figure 3:
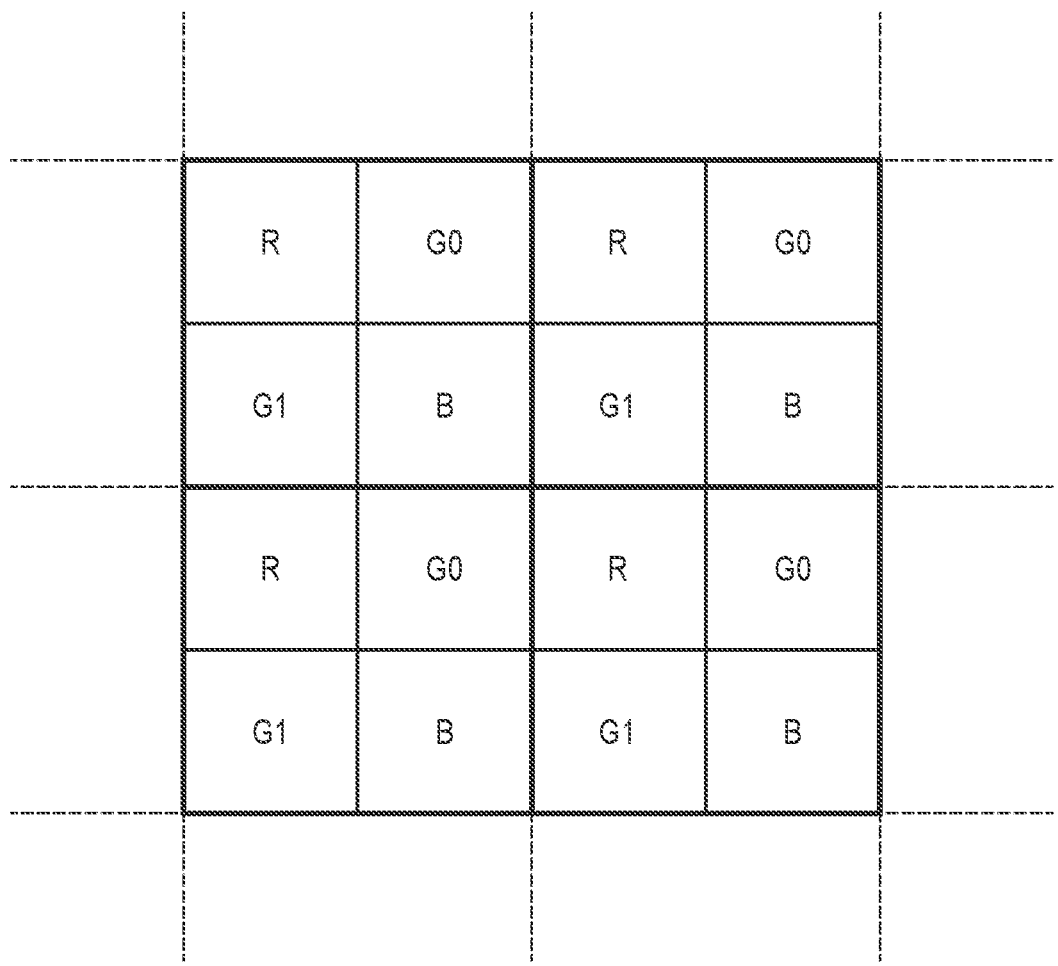
FIG. 3 is a diagram for explaining a Bayer arrangement.

Next, decoding of the encoded image data generated in the above procedure will be described. FIG. 2 is a block diagram of the image decoding apparatus according to the present embodiment.

The image decoding apparatus according to the present embodiment includes an entropy decoding unit 200, an inverse-quantization unit 201, an inverse-transform unit 202, and a Bayer conversion unit 203, as illustrated.

The entropy decoding unit 200 entropy-decodes the encoded image data by EBCOT (Embedded Block Coding with Optimized Truncation) or the like, decodes the wavelet coefficients and the quantization parameters in the subbands of the respective planes, and transfers them to the inverse-quantization unit 201.

The inverse-quantization unit 201 inversely quantizes the restored wavelet transform coefficients sent from the entropy decoding unit 200 using the quantization parameters, and transfers the data obtained by the inverse quantization to the inverse-transform unit 202.

The inverse-transform unit 202 performs an inverse frequency transform on the frequency transform coefficients restored by the inverse-quantization unit 201, reconstructs 16 plane data of GL, GH, GH01, GH23, RL, RH, BL, BH, and W0 to W7, and transfers them to the Bayer conversion unit 203.

The Bayer conversion unit 203 performs inverse plane conversion on GL, GH, GH01, GH23, RL, RH, BL, BH, and W0 to W7 independently reconstructed by the inverse-transform unit 202. Then, the Bayer conversion unit 203 restores R0, R1, G0 to G3, B0, B1 and W0 to W7 based on the data obtained by the obtained inverse plane conversion. Thereafter, the Bayer conversion unit 203 rearranges these R0, R1, G0 to G3, B0, B1, and W0 to W7 according to the dual Bayer+HDR array, re-synthesizes them, and outputs the 4×4 pixel regions of the original RAW image data.

Here, the reconstruction of G components G0 to G4 can be calculated in accordance with the following conversion formulas.

$GL01 = (GL + GH)/2$ $GL23 = (GL - GH)/2$ $G0 = (GL01 + GH01)/2$ $G1 = (GL01 - GH01)/2$ $G2 = (GL23 + GH23)/2$ $G3 = (GL23 - GH23)/2$

Here, the reconstruction of R components R0 and R1 can be calculated in accordance with the following conversion formulas.

$R0 = (RL + RH)/2$ $R1 = (RL - RH)/2$

Here, the reconstruction of B components B0 and B1 can be calculated in accordance with the following conversion formulas.

$B0 = (BL + BH)/2$ $B1 = (BL - BH)/2$

Since the W component is not subjected to the plane conversion, the data obtained by the inverse plane conversion can be used as it is.

In the above embodiment, when the RAW image array is a dual Bayer+HDR array of repetitive patterns of 4×4 pixels illustrated in FIG. 4, coding with high coding efficiency can be realized by converting the data into 16-plane data with uniform pixel spacing and coding. Incidentally, since the vertical horizontal resolution of each plane is the same in the present embodiment, the size of the line buffers required when performing a frequency transform can be made to be the same, and a circuit configuration that takes into consideration the processing time of each plane being the same can be considered. In addition, since three pixels are jumped both horizontally and vertically in all planes as compared to the original RAW image, it is possible to perform quantization treating frequency transform separation properties as the same. Note that configuration may be taken such that the generation of GL and GH at the time of the plane conversion of the G component is not performed in a stepwise manner, but rather is performed all at once using the following formulas.

$GL = G0 + G1 + G2 + G3$ $GH = (G0 + G1) - (G2 + G3)$

In the above example, the capturing sensor in the image capturing unit 100 has been described as having a filter of the dual Bayer+HDR arrangement illustrated in FIG. 4. Here, in addition to the three primary colors of the RGB, the processing of the plane conversion unit 101 in the case where the N×N pixels (in the embodiment, N=4) including white pixels dedicated to luminance are used in a repetitive pattern will be described in accordance with the flowchart of FIG. 8.

In step S1, the plane conversion unit 101 inputs data of an N×N pixel region which is a unit of a repeating pattern in the RAW image data.

In step S2, the plane conversion unit 101 calculates the respective low-frequency component and high-frequency component values for the respective components of R, G, and B, which are the three primary colors, in the inputted N×N pixel region. Further, for W pixels, the calculation is not performed.

In step S3, the plane conversion unit 101 stores, in plane buffers prepared for each (16 plane buffers in the case of the embodiment), low-frequency component values and high-frequency component values calculated based on each of the three primary colors and all W pixel values in the N×N pixel region.

In step S4, the plane conversion unit 101 determines whether or not the conversion of all regions of the RAW image has been completed. If not, the plane conversion unit 101 returns the process to step S1 in order to perform the conversion for the next N×N pixel region. When it is determined that the conversion of all regions of the RAW image has been completed, the plane conversion unit 101 advances the process to step S5.

In step S5, the plane conversion unit 101 outputs the plane data stored in the plane buffer to (the frequency transform unit 102 of) the RAW encoding unit 110 in accordance with a preset order.

Since the RAW encoding unit 110 only performs the encoding process for each plane in accordance with the given target code amount, a description thereof is omitted.

As a result of the above, the low-frequency component plane and the high-frequency component plane of the three primary colors generated by the plane conversion unit 101 are planes composed of component values of the same period as in the RAW image. In addition, for example, a plane of W0, a plane of W1, of the W component may also be planes composed of pixel values of the same period, and efficient coding can be realized.

Second Embodiment

Next, an image encoding apparatus according to the second embodiment will be described with reference to FIGS. 1 and 7. The configuration of the second embodiment is the same as that of the above-described first embodiment, but the conversion processing performed by the plane conversion unit 101 is different. As a result, the code amount allocation performed by the code amount controller 103 is also different. Since the other operations are the same as those of the first embodiment, the description thereof is omitted.

As illustrated in FIG. 7, the plane conversion unit 101 of the second embodiment, with 4×4 pixel array units of the R component {R0, R1}, the G component {G0, G1, G2, G3}, the B component {B0, B1}, and the W component {W0, W1}, performs the following plane conversion for each color component. Note that the conversion of the G, R, and B components is the same as in the first embodiment, and the second embodiment is different in that conversion of the W component is performed.

First, the plane conversion of the G component will be described. In the plane conversion of the G component in a 4×4 pixel region, the plane conversion unit 101 performs the following conversions using the G0, G1, G2, and G3 present in the region.

$GL01 = G0 + G1$ $GH01 = G0 - G1$ $GL23 = G2 + G3$ $GH23 = G2 - G3$

Subsequently, the plane conversion unit 101 executes the following conversion using GL01 and GL23 which are obtained by the above-described calculations.

$GL = GL01 + GL23$ $GH = GL01 - GL23$

Then, the plane conversion unit 101 transmits GL, GH, GH01, and GH23 obtained by the above calculations to the frequency transform unit 102.

Next, the plane conversion of the R component will be described. In the plane conversion of the R component in a 4×4 pixel region, the plane conversion unit 101 performs the following conversions using the R0 and R1 present in the region.

$RL = R0 + R1$ $RH = R0 - R1$

The plane conversion unit 101 transmits RL and RH obtained by the above conversions to the frequency transform unit 102.

Next, the plane conversion of the B component will be described. In the plane conversion of the B component in a 4×4 pixel region, the plane conversion unit 101 performs the following conversions using the B0 and B1 present in the region.

$BL = B0 + B1$ $BH = B0 - B1$

The plane conversion unit 101 transmits the BL and BH and obtained by the above conversions to the frequency transform unit 102.

Finally, the plane conversion of the W component will be described. As illustrated in FIG. 7, in the 4×4 pixel region, there are four W0s and W1s each. In the embodiment, a 4×4 pixel region is divided into four 2×2 pixel regions, and each 2×2 pixel region is divided into a group comprising a W0 in a first line and a group comprising a W1 in a second line, and a transform is performed by the following formulas.

$WL = \Sigma W0 + \Sigma W1$ $WH = \Sigma W0 - \Sigma W1$

Here, $\Sigma W0$ represents the sum of four W0s, and $\Sigma W1$ represents the sum of four W1s. Therefore, WL is the sum of four W0s and four W1s and corresponds to taking the average of W0 and W1, and therefore corresponds to a low-frequency component of the frequency transform, and corresponds to generating intermediate pixels for W0 and W1. On the other hand, WH corresponds to a high-frequency component of the frequency transform.

Since the arrangement of pixels of the WL plane is a uniform 1-pixel jump in the horizontal and the vertical, it is suitable for separating high-frequency components and low-frequency components in the downstream frequency transform unit 102. Therefore, it is possible to appropriately reduce high-frequency components while leaving low-frequency components which have a large effect on the image quality when performing quantization in the quantization unit 104.

The frequency transform unit 102 performs a wavelet transform on each of the 10 plane data of GL, GH, GH01, GH23, RL, RH, BL, BH, WL, and WH inputted from the plane conversion unit 101, and thereafter sends the transform coefficients generated for each subband to the quantization unit 104.

The code amount controller 103 determines a target code amount to be allocated to each picture and each plane according to a compression ratio set by the user, and transmits the target code amount to the quantization unit 106. At this time, a code amount is uniformly allocated to each of the color components of R, G, B, and W, and when the code amount is allocated between the planes of the same color, the code amount is allocated by using the following relations.

$GL>GH>GH01=GH23$      G component:

$RL>RH$      R component:

$BL>BH$      B component:

$WL>WH$      W component:

As described above, GL corresponds to the low-frequency component of the secondary frequency component, GH corresponds to the high-frequency component of the secondary GH, and GH01 and GH23 correspond to the high-frequency component of a one level frequency transform. Therefore, by allocating a large amount of code to a low-frequency component which has a large effect on image quality and reducing the amount of code allocated to a high-frequency component which has a smaller effect on the image quality, efficient coding that ensures image quality is performed. Similarly, since the components RL, BL, and WL correspond to low-frequency components and RH, BH, and WH correspond to high-frequency components, a large amount of code is allocated to the components BL, RL, and WL which have a large effect on the image quality, and a small amount of code is allocated to the components RH, BH and WH.

In the above-described second embodiment, the RAW image data of the dual Bayer+HDR array is converted into data of 10 planes having a uniform pixel interval and encoded, whereby encoding with high encoding efficiency is realized.

The above describes an example in which RAW image data of the dual Bayer+HDR array illustrated in FIG. 7 is converted into 10 planes and encoded. As illustrated in FIG. 7, four W0s and W1s are present in the 4×4 pixel region. However, since the W0 and W1 obtained by decoding the encoded data obtained by the above plane conversion are the average values of the original four W0s and W1s, it is only possible to reproduce the 4×4 pixel region with four W0s having the same value (average value) and four W1s having the same value (average value).

Therefore, the following describes a conversion process of the W component by the plane conversion unit 101 that enables reproduction four W0s and W1s in the original 4×4 pixel region. Note that the plane conversion of other components is assumed to be the same as described above.

First, the plane conversion unit 101 subdivides the 4×4 pixel region in the RAW image data of the dual Bayer+HDR array into the four sub-regions (0) to (3) which are 2×2 pixel regions, that is, into the 2×2 pixel sub-region (0) including G0 and G1, the 2×2 pixel sub-region (1) including R0 and R1, the 2×2 pixel sub-region (2) including B0 and B1, and the 2×2 pixel sub-region (3) including G2 and G3.

Then, for one sub-region (i) (i=either 0, 1, 2, or 3), the plane conversion unit 101 performs the following conversion.

$$WL(i)=W0+W1$$

$$WH(i)=W0-W1$$

The plane conversion unit 101 performs the above conversion on the sub-regions (0) to (3), and transmits WL(i) and WH(i) obtained in the respective sub-regions to the frequency transform unit 102. Ultimately, the plane conversion unit 101 converts the inputted RAW image data into 16 plane data of GL, GH, GH01, GH23, RL, RH, BL, BH, WL(0), WH(0), WL(1), WH(1), WL(2), WH(2), WL(3), and WH(3), and transmits the converted RAW image data to the frequency transform unit 102.

By performing the processing in this manner, similarly to the first embodiment, the area of each plane is universally 16 planes, and it is possible to realize a circuit configuration in which the size of a required line buffer or the like is made to be the same, and in which the processing time for each plane is considered to be the same. Further, in WL and WH planes, since the pixel arrangement in which there are one-pixels jumps in the horizontal and the vertical compared to the original RAW image, it is possible to reduce wrapping at the time of frequency transform due to pixel jumps more than in the other planes, and it is possible to perform more efficient coding.

In the above embodiment, an example in which R, G, and B are described as the three primary colors, but there is no limitation to RGB, and Y (yellow), M (magenta), and C (cyan) are also possible. In the above embodiment, an example in which white (W color) is arranged in a checkerboard pattern has been described, but a color by which it is possible to detect luminance may be used, and for example, a yellow filter may be used as a filter for luminance when R, G, and B filters are used as the three primary colors.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-020069, filed Feb. 10, 2021, which is hereby incorporated by reference herein in its entirety.

What is claimed is:

1. An image encoding apparatus operable to encode RAW image data obtained from a capturing sensor that has a color filter array in which a plurality of filters for each of three primary colors and a plurality of filters for a specific color for luminance are arranged in an N×N pixel region and in which the filters of the N×N pixel region are repeated, the image encoding apparatus comprising:
   one or more processors; and
   a memory storing instructions which, when executed by the one or more processors, causes the image encoding apparatus to function as a plurality of units comprising:
   (1) a conversion unit configured to convert the RAW image data into a plurality of planes that are each configured by a single color component; and
   (2) an encoding unit configured to encode each plane obtained by the conversion unit,
   wherein the conversion unit, for each component representing the three primary colors, by referencing pixel values of the same component in the N×N pixel region, generates a plane configured by a low-frequency component data and a plane configured by a high-frequency component,
   wherein the three primary colors are an R color, a G color, and a B color,
   wherein the number of filters arranged for the G color is twice the number of R color filters and twice the number of B color filters in the N×N pixel region, and
   wherein the conversion unit, (i) for the R color and the B color, references pixel values of the same color component in the N×N pixel region, calculates a primary low-frequency value and high-frequency value, and generates a plane configured by primary low-frequency values and a plane configured by primary high-frequency values, and (ii) for the G color, calculates a primary low-frequency value and a primary high-frequency value based on pixel values of the same color component in the N×N pixel region, and a secondary low-frequency value and high-frequency value based on the primary low-frequency value, and generates a plane based on the primary high-frequency value, a plane based on the secondary high-frequency value, and a plane based on the secondary low-frequency value.

2. The apparatus according to claim 1, wherein the specific color is a white color.

3. The apparatus according to claim 1, wherein the filters of the specific color are arranged in a checkered pattern in the N×N pixel region, and color filters are arranged to be respectively diagonally adjacent for each component representing the three primary colors.

4. The apparatus according to claim 1, wherein the conversion unit, for each component representing the three primary colors, generates a plane configured by low-frequency component data and a plane configured by high-frequency component data by referencing pixel values of the same component which are diagonally adjacent in the N×N pixel region.

5. The apparatus according to claim 1, wherein the conversion unit, for a component of the specific color, generates a plurality of planes configured by pixel values of positions that are the same relatively in the N×N pixel region.

6. The apparatus according to claim 1, wherein the conversion unit divides the components of the specific color into two groups based on relative position in the N×N pixel region, obtains an average value of each group, and generates a low-frequency plane and a high-frequency plane based on the average values.

7. The apparatus according to claim 1, wherein the conversion unit divides the components of the specific color into a plurality of groups based on relative position in the N×N pixel region, and generates a low-frequency plane and a high-frequency plane for each of the plurality of groups.

8. The apparatus according to claim 1, wherein the N×N pixel region is a 4×4 pixel region,
   wherein 8 white color filters are arranged in a checkered pattern, 4 G color filters are arranged to be diagonally adjacent, and 2 R and B color filters are respectively arranged to be diagonally adjacent in the 4×4 pixel region, and
   wherein the conversion unit, (i) for the R color and the B color, references two pixel values of the same color component which are arranged to be diagonally adjacent in the 4×4 pixel region, calculates a primary low-frequency value and a primary high-frequency value, and generates two planes: a plane configured by a primary low-frequency value and a plane configured by a primary high-frequency value, and (ii) for the G color, calculates two primary low-frequency values and two primary high-frequency values based on four pixel values that are diagonally adjacent in the 4×4 pixel region, and based on the two primary low-frequency values, calculates a secondary low-frequency value and a secondary high-frequency value, and generates two planes corresponding respectively to two primary high-frequency values; the secondary high-frequency value plane; and the secondary low-frequency value plane.

9. The apparatus according to claim 8, wherein the conversion unit, by dividing four pixel values diagonally adjacent in the 4×4 pixel region into two adjacent groups of two pixels each, and calculating a low-frequency value and a high-frequency value for each group, calculates two primary low-frequency values and two primary high-frequency values.

10. The apparatus according to claim 5, wherein the N×N pixel region is a 4×4 pixel region,
   wherein in the 4×4 pixel region, 8 filters of the specific color, 4 G color filters, and 2 R and B color filters respectively are arranged, and
   wherein the conversion unit, for the specific color, generates 8 planes configured by pixel values of positions that are the same relatively in the 4×4 pixel region.

11. The apparatus according to claim 6, wherein the N×N pixel region is a 4×4 pixel region,
wherein in the 4×4 pixel region, 8 filters of the specific color, 4 G color filters, and 2 R and B color filters respectively are arranged, and
wherein the conversion unit, for the specific color, divides 8 pixel values of the 4×4 pixel region into 2 groups having the same relative positional relationship, and generates 2 planes: a low-frequency plane and a high-frequency plane that are based on an average value of each group.

12. The apparatus according to claim 7, wherein the N×N pixel region is a 4×4 pixel region,
wherein in the 4×4 pixel region, 8 filters of the specific color, 4 G color filters, and 2 R and B color filters respectively are arranged, and
wherein the conversion unit, by generating a plane configured by low-frequency component data and a plane configured by a high-frequency component from each of four 2×2 pixel regions included in the 4×4 pixel region, generates a total of eight planes.

13. The apparatus according to claim 1, wherein the coding unit comprises:
a wavelet transform unit configured to perform a wavelet transform on a plane to be encoded;
a quantization unit configured to quantize, in accordance with a quantization parameter according to a type including a color of a plane to be encoded, a subband obtained by the wavelet transform unit; and
an entropy coding unit configured to entropy encode the quantized data obtained by the quantization unit.

14. A method of controlling an image encoding apparatus operable to encode RAW image data obtained from a capturing sensor that has a color filter array in which a plurality of filters for each of three primary colors and a plurality of filters for a specific color for luminance are arranged in an N×N pixel region and in which the filters of the N×N pixel region are repeated, the method comprising:
converting the RAW image data into a plurality of planes that are each configured by a single color component; and
encoding each plane obtained in the converting,
wherein in the converting, for each component representing the three primary colors, by referencing pixel values of the same component in the N×N pixel region, a plane configured by a low-frequency component data and a plane configured by a high-frequency component are generated,
wherein the three primary colors are an R color, a G color, and a B color,
wherein the number of filters arranged for the G color is twice the number of R color filters and twice the number of B color filters in the N×N pixel region, and
wherein the converting, (i) for the R color and the B color, references pixel values of the same color component in the N×N pixel region, calculates a primary low-frequency value and high-frequency value, and generates a plane configured by primary low-frequency values and a plane configured by primary high-frequency values, and (ii) for the G color, calculates a primary low-frequency value and a primary high-frequency value based on pixel values of the same color component in the N×N pixel region, and a secondary low-frequency value and high-frequency value based on the primary low-frequency value, and generates a plane based on the primary high-frequency value, a plane based on the secondary high-frequency value, and a plane based on the secondary low-frequency value.

15. A non-transitory computer-readable storage medium storing a program which, when read and executed by a computer, causes the computer to execute the steps of a method of controlling an image encoding apparatus operable to encode RAW image data obtained from a capturing sensor that has a color filter array in which a plurality of filters for each of three primary colors and a plurality of filters for a specific color for luminance are arranged in an N×N pixel region and in which the filters of the N×N pixel region are repeated, the method comprising:
converting the RAW image data into a plurality of planes that are each configured by a single color component; and
encoding each plane obtained in the converting,
wherein in the converting, for each component representing the three primary colors, by referencing pixel values of the same component in the N×N pixel region, a plane configured by a low-frequency component data and a plane configured by a high-frequency component are generated,
wherein the three primary colors are an R color, a G color, and a B color,
wherein the number of filters arranged for the G color is twice the number of R color filters and twice the number of B color filters in the N×N pixel region, and
wherein the converting, (i) for the R color and the B color, references pixel values of the same color component in the N×N pixel region, calculates a primary low-frequency value and high-frequency value, and generates a plane configured by primary low-frequency values and a plane configured by primary high-frequency values, and (ii) for the G color, calculates a primary low-frequency value and a primary high-frequency value based on pixel values of the same color component in the N×N pixel region, and a secondary low-frequency value and high-frequency value based on the primary low-frequency value, and generates a plane based on the primary high-frequency value, a plane based on the secondary high-frequency value, and a plane based on the secondary low-frequency value.

16. An image encoding apparatus operable to encode RAW image data obtained from a capturing sensor that has a color filter array in which a plurality of filters for each of three primary colors and a plurality of filters for a specific color for luminance are arranged in an N×N pixel region and in which the filters of the N×N pixel region are repeated, the image encoding apparatus comprising:
one or more processors; and
a memory storing instructions which, when executed by the one or more processors, causes the image encoding apparatus to function as a plurality of units comprising:
(1) a conversion unit configured to convert the RAW image data into a plurality of planes that are each configured by a single color component; and
(2) an encoding unit configured to encode each plane obtained by the conversion unit,
wherein the conversion unit, for each component representing the three primary colors, by referencing pixel values of the same component in the N×N pixel region, generates a plane configured by a low-frequency component data and a plane configured by a high-frequency component, and
wherein the conversion unit, for each component representing the three primary colors, generates a plane configured by low-frequency component data and a plane configured by high-frequency component data by referencing pixel values of the same component which are diagonally adjacent in the N×N pixel region.

17. An image encoding apparatus operable to encode RAW image data obtained from a capturing sensor that has a color filter array in which a plurality of filters for each of three primary colors and a plurality of filters for a specific color for luminance are arranged in an N×N pixel region and in which the filters of the N×N pixel region are repeated, the image encoding apparatus comprising:
  one or more processors; and
  a memory storing instructions which, when executed by the one or more processors, causes the image encoding apparatus to function as a plurality of units comprising:
  (1) a conversion unit configured to convert the RAW image data into a plurality of planes that are each configured by a single color component; and
  (2) an encoding unit configured to encode each plane obtained by the conversion unit,
  wherein the conversion unit, for each component representing the three primary colors, by referencing pixel values of the same component in the N×N pixel region, generates a plane configured by a low-frequency component data and a plane configured by a high-frequency component,
  wherein the conversion unit divides the components of the specific color into a plurality of groups based on relative position in the N×N pixel region, and generates a low-frequency plane and a high-frequency plane for each of the plurality of groups,
  wherein the N×N pixel region is a 4×4 pixel region,
  wherein in the 4×4 pixel region, 8 filters of the specific color, 4 G color filters, and 2 R and B color filters respectively are arranged, and
  wherein the conversion unit, by generating a plane configured by low-frequency component data and a plane configured by a high-frequency component from each of four 2×2 pixel regions included in the 4×4 pixel region, generates a total of eight planes.

\* \* \* \* \*